United States Patent [19]

Sasaki

[11] Patent Number: 5,498,380
[45] Date of Patent: Mar. 12, 1996

[54] PLASTIC RESIN KNEADING/EXTRUDING METHOD AND APPARATUS BY ALTERNATE EXTRUSIONS OF CYLINDERS

[75] Inventor: Beji Sasaki, Tokyo, Japan

[73] Assignee: Friends of Freesia Co., Ltd., Tokyo, Japan

[21] Appl. No.: 373,276

[22] Filed: Jan. 27, 1995

[30] Foreign Application Priority Data

Aug. 10, 1992 [JP] Japan .................................. 4-253392
Jan. 25, 1993 [JP] Japan .................................. 5-043135
Apr. 15, 1993 [JP] Japan .................................. 5-126479

[51] Int. Cl.$^6$ ........................... B29C 47/50; B29C 47/56
[52] U.S. Cl. ................. 264/39; 264/176.1; 264/211.23; 425/204; 425/205; 425/208; 425/226
[58] Field of Search ..................... 264/39, 176.1, 264/323, 40.7; 425/190 R, 325–327, 379.1, 204–205, 376.1, 585, 225–227

[56] References Cited

U.S. PATENT DOCUMENTS

| | | | |
|---|---|---|---|
| 2,366,417 | 1/1945 | MacMillin | 264/176.1 |
| 2,563,396 | 8/1951 | Colombo | 425/204 |
| 2,683,895 | 7/1954 | Scofield | 425/190 |
| 3,165,785 | 1/1965 | Hehl | 425/585 |
| 3,708,256 | 1/1973 | Kopp | 425/376.1 |
| 3,748,074 | 7/1973 | Nitta et al. | 264/176.1 |
| 3,918,869 | 11/1975 | van der Ploeg | 425/190 |
| 4,411,532 | 10/1983 | Holmes et al. | 425/225 |
| 4,643,661 | 2/1987 | Chszaniecke | 425/204 |
| 4,897,236 | 1/1992 | Rabiger et al. | 264/211.24 |
| 5,156,861 | 10/1992 | Tsuchiya et al. | 425/225 |

OTHER PUBLICATIONS

Modern Plastics International, vol. 24, No. 1, Jan. 1994, p. 24, Stephen Moore, "Revolving Extruders Simplify Batch Production, Changeover".
Patent Abstracts of Japan, vol. 6, No. 163 (M–152), Aug. 26, 1982, JP–57–077541, May 14, 1982.
Patent Abstracts of Japan, vol. 8, No. 94 (M–293), Apr. 28, 1984, JP–59–009033, Jan. 18, 1984.
Patent Abstracts of Japan, vol. 7, No. 203 (M–241), Sep. 8, 1983, JP–58–102737, Jun. 18, 1983.
Patent Abstracts of Japan, vol. 8, No. 201 (M–325), Sep. 14, 1984, JP–59–089130, May 23, 1984.

*Primary Examiner*—Jeffery R. Thurlow
*Attorney, Agent, or Firm*—Oblon, Spivak, McClelland, Maier & Neustadt

[57] ABSTRACT

A plastic resin kneading/extruding method using one auxiliary equipment including a screw drive source and a resin feed hopper, and a plurality of extruding units each including a cylinder with a feed opening and a screw and having their operations composed of an extruding step of kneading and extruding the plastic resin and a cleaning step of cleaning the screw and the cylinder, characterized in that the extruding step and the cleaning step are sequentially alternated for each of the extruding units. Thus, it is possible to realize a kneading/extruding method and an apparatus therefor, which can accomplish synthetically continuous extruding operations without the extruding step zone being interrupted by the cleaning step zone and which can eliminate the defects of the prior art thereby to have a high extruding efficiency.

6 Claims, 4 Drawing Sheets

PLASTIC RESIN KNEADING/EXTRUDING METHOD AND APPARATUS BY ALTERNATE EXTRUSIONS OF CYLINDERS

TECHNICAL FIELD

The present invention relates to a kneading/extruding method and a kneading/extruding apparatus of plastic resins.

BACKGROUND ART

The kneading/extruding method and apparatus of plastic resins are composed of an extruding unit and an auxiliary equipment and their operations.

The extruding unit is composed of a cylinder with a feed opening and a screw for kneading and extruding a resin. The extruding unit performs the kneading/extruding operation at an extruding step zone and the cleaning operation at a cleaning step zone.

The auxiliary equipment is mainly composed of a hopper and a drive source. The hopper feeds the resin to the extruding unit from a feed opening, and the drive source drives the screw.

The operations continuously circulates in the sequence of the extruding step zone, the cleaning step zone and the extruding step zone.

Although the extruding operation should be main, it has to be interrupted at the cleaning step zone. It is the defects of the method and apparatus of the prior art that the extruding efficiency must drop according to the interruption.

The basic concept of the present invention is to eliminate the interruption of the extruding step zone by combining a plurality of extruding units with a single auxiliary equipment.

An object of the present invention is to realize the kneading/extruding method and apparatus which are enabled to eliminate the defect of the prior art and to have a high extruding efficiency by making the synthetically continuous extruding operations possible.

DISCLOSURE OF THE INVENTION

The present invention provides for a plastic resin kneading/extruding method using one auxiliary equipment including a screw drive source and a resin feed hopper, and a plurality of extruding units each including a cylinder with a feed opening and a screw and having their operations composed of an extruding step of kneading and extruding the plastic resin and a cleaning step of cleaning the screw and the cylinder. The extruding units are disposed in such relative positions as can have their positions interchanged with their feed openings being always held upright. The extruding units are disposed in such relative positions that one of them is set in an extruding position for an extruding step and used as an active extruding unit whereas the remaining extruding unit other than the active extruding unit is set in a cleaning position for a cleaning step and used as a cleaning unit. The active extruding unit has its position interchanged, when it is to be cleaned, by that of the cleaning unit.

BEST MODE FOR CARRYING OUT THE INVENTION

The present invention will be described in more detail with reference to the accompanying drawings.

Figure 1:
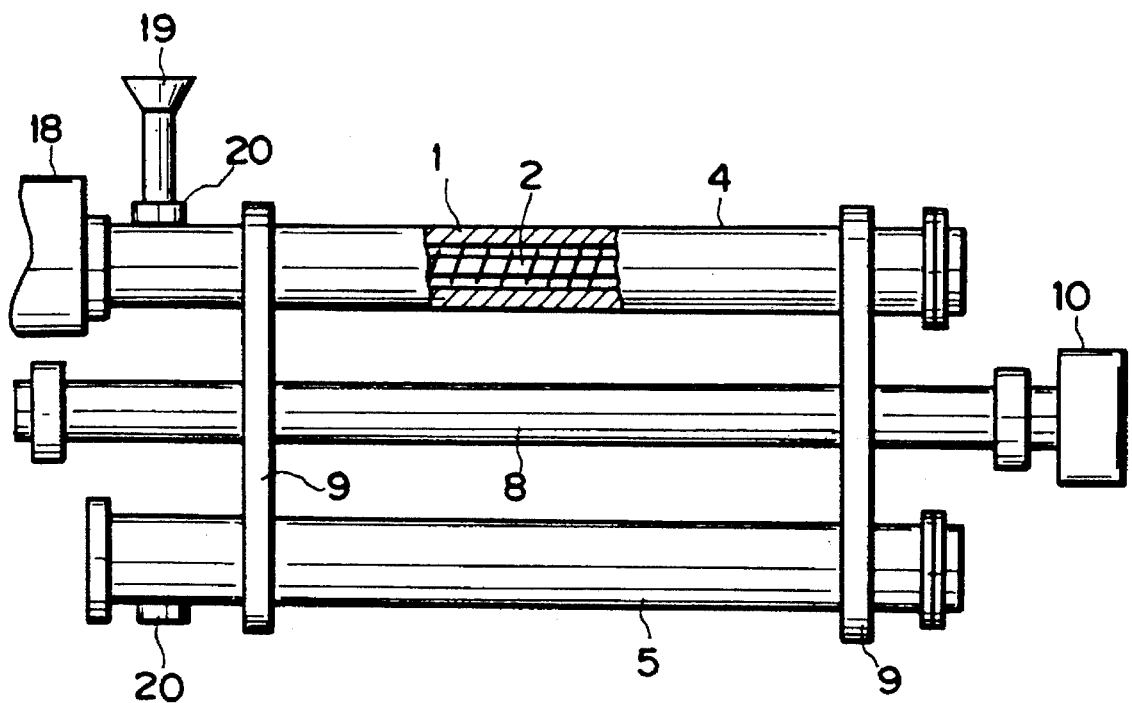
FIG. 1 and FIG. 2 are a side elevation and a transverse section of the case of two extruding units.
Figure 2:
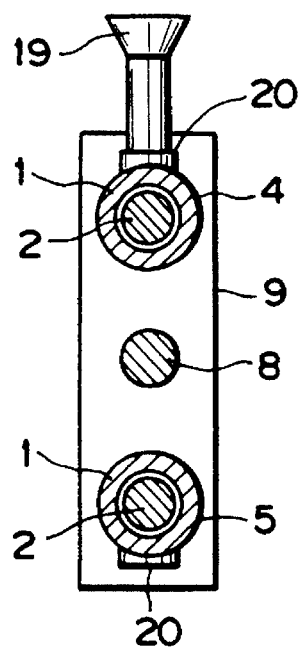
Figure 3:
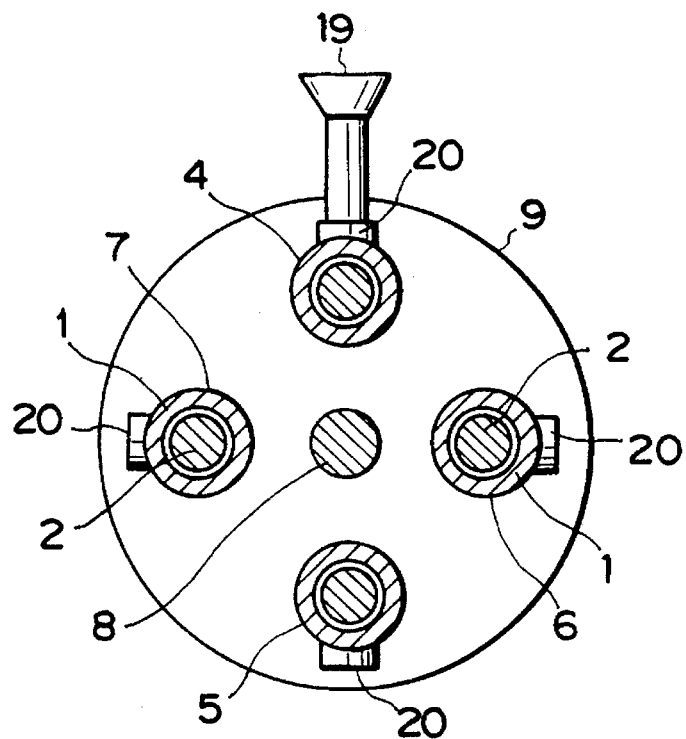
FIG. 3 is a transverse section of the case of four extruding units.
Figure 4:
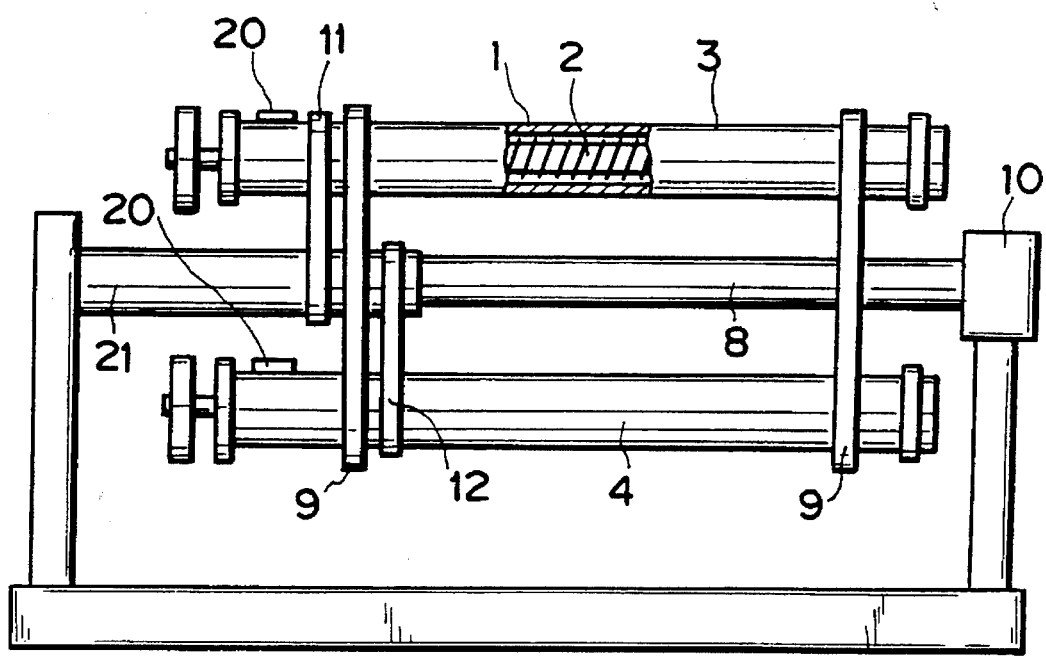
FIG. 4 is a side elevation of the case in which a feed opening is upright.
Figure 5:
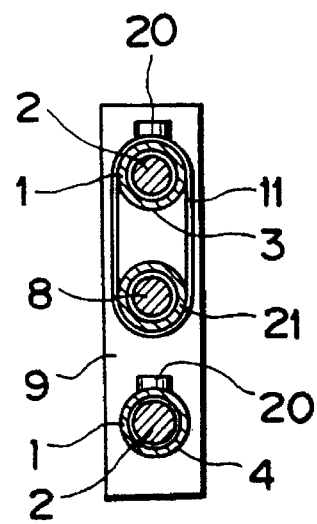
FIG. 5, FIG. 6 and FIG. 8 are transverse sections of the same case.

There is provided one auxiliary equipment which includes a screw drive source 18 and a resin feed hopper 19. There are provided a plurality of extruding units each of which includes a cylinder 1 with a feed opening and a screw 2. Numerals 3, 4, 5, 6 and 7 designate the extruding units. The extruding units 4 and 5 are supported on a revolver shaft 8 by support arms 9 in symmetry with respect to the revolver shaft 8. Likewise, in the case of FIG. 3, the extruding units 4, 5, 6 and 7 are held in relations to have their positions interchanged when revolved on the revolver shaft 8. These extruding units are arranged on a common circle around the revolver shaft 8, and their number may be two or more.

The revolver shaft 8 is revolved by a revolving mechanism 10.

One of the extruding units is used as the active extruding unit 4 in the extrusion position of the extruding step. The remaining extruding units other than the active extruding unit 4 are used as the cleaning units 5, 6 and 7 in the cleaning positions of the cleaning step. The active extruding unit 4 is revolved, when it is to be cleaned, to have its position interchanged by any of the cleaning units 5, 6 and 7. The extruding unit transfers to the extruding step when it comes to the extruding position. When an extruding unit comes to the cleaning position, its cleaning step is ended by the next revolving. This revolving can be ended within a short time period. The position interchange has been executed by the revolving. However, the position interchanging method should not be limitative but can be exemplified by another method such as a parallel moving method, as taken in a horizontal direction.

With reference to FIGS. 4 to 8, here will be described the case in which the extruding units have their positions interchanged with their feed openings being always held upright.

The extruding units 3 and 4 are supported on the revolver shaft 8 by the support arms 9 in symmetry with respect to the revolver shaft 8. These extruding units 3 and 4 are held in relation to have their positions interchanged when turned or revolved on the revolver shaft 8. The revolver shaft 8 is revolved by the revolving mechanism 10. One of the extruding units is used as the active extruding unit 3 in the extruding position of the extruding step. The remaining extruding unit other than the active extruding unit 3 is used as the cleaning extruding unit 4 in the position of the cleaning step. The active extruding unit 3 is revolved, when it is to be cleaned, to have its position interchanged with that of the cleaning extruding unit 4. When the extruding unit comes to the extruding position, it transfers to the extruding step. The cleaning unit having reached the cleaning position is cleaned out by the next revolving. The resin is introduced from a feed opening 20. The position interchange is carried out with the feed opening 20 being always held upright. However, this mechanism is suitable but not limitative. One embodiment of this mechanism will be described with reference to the drawings.

Figure 6:
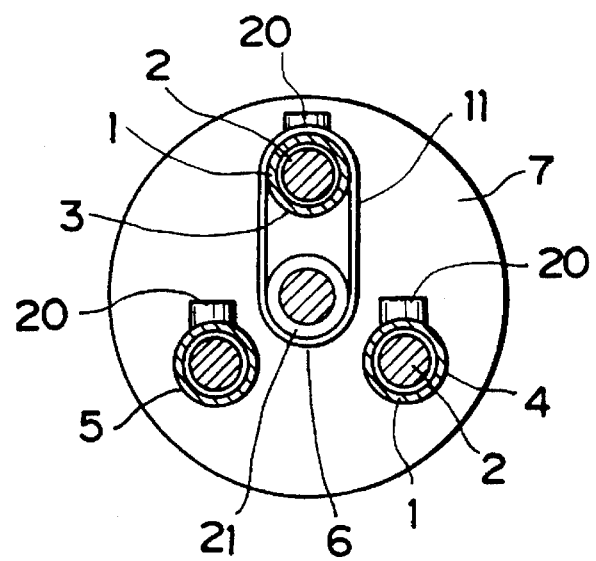

The revolver shaft 8 has its leading end borne by a stationary cylinder 21. One support arm 9 is fixed on the revolver shaft 8 whereas the other support arm 9 is not fixed on the stationary cylinder 21. An endless band 11 such as a belt or chain is made to run between the stationary cylinder 21 and the extruding unit 3. The stationary cylinder 21 and the extruding unit 3 are given the same diameter at their portions on which the endless band 11 runs. The extruding units 3 and 4 are individually borne in a rotatable manner by the support arms 9. An endless band 12 is made to run between the stationary cylinder 21 and the extruding unit 4. The stationary cylinder 21 and the extruding unit 4 are given the same diameter at their portions on which the endless band 12 runs. When the positions of the extruding units 3 and 4 are interchanged by revolving the revolver shaft 8, the feed openings 20 are always held upright by the actions of the endless bands 11 and 12. FIG. 6 shows the case of the extruding units 3, 4 and 5, in which the feed openings 20 are always held upright by the actions of the endless bands. A similar effect can also be attained even if the number of extruding units is four or more.

Figure 7:
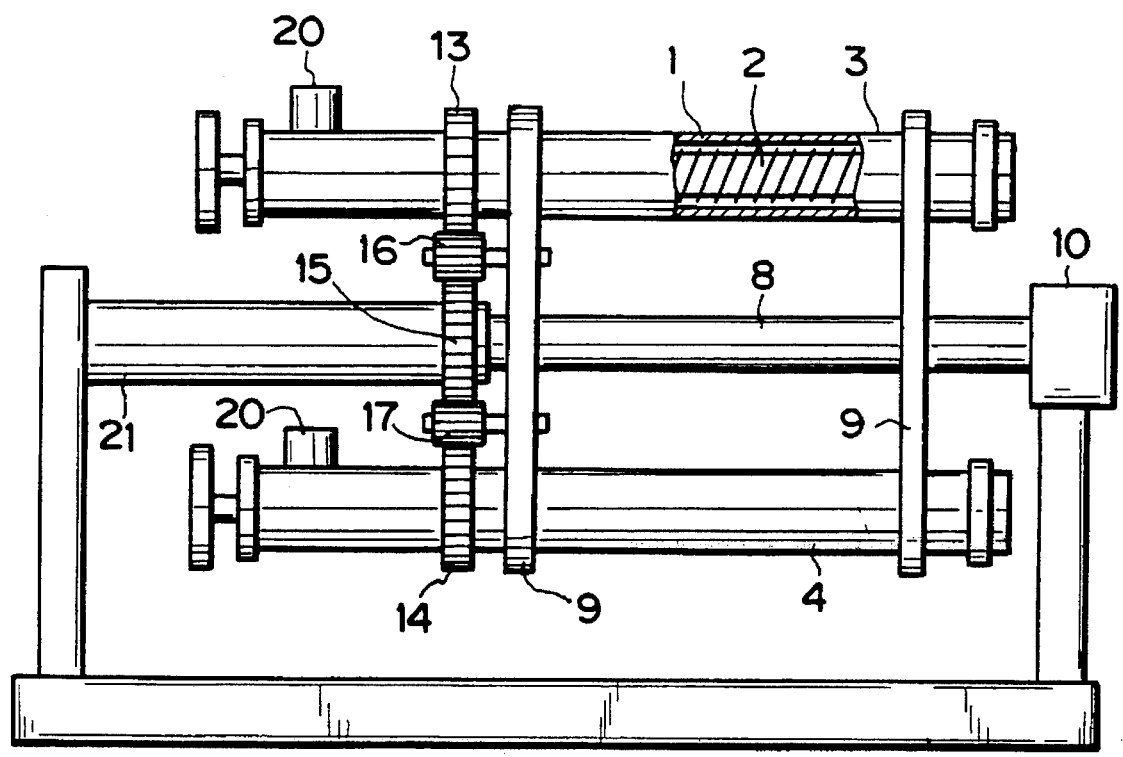
FIG. 7 is a side elevation of the same case.
Figure 8:
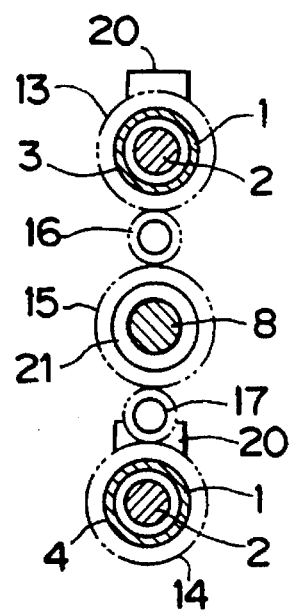

Another embodiment is shown in FIG. 7 and FIG. 8. A stationary wheel 15 is fixed on the stationary cylinder 21. Extruder wheels 13 and 14 are fixed on the extrusion units 3 and 4, respectively. The extruder wheels 13 and 14 and the stationary wheel 15 may be exemplified by friction pulleys or gears. Their external diameters are equalized in the case of the friction wheels, whereas the pitch circle diameters are equalized in the case of the gears. An intermediate wheel 16 is associated with the extruder wheel 13 and the stationary wheel 15 and has its shaft borne by the support arm 9. An intermediate wheel 17 is associated with the extruder wheel 14 and the stationary wheel 15 and has its shaft borne by the support arm 9. When the positions of the extruding units 3 and 4 are interchanged by revolving the revolver shaft 8, the feed openings 20 are always held upright by the actions of the extruder wheels 13 and 14, the stationary wheel 15 and the intermediate wheels 16 and 17. When the support arm 9 is revolved by the revolver shaft 8, the active extruder unit 3 at the extruding step is interchanged by the cleaning extruding unit 4 and is cleaned out to stand by until its position is interchanged with the position of the active extruding unit 3 by the next revolution.

Thus, the interruption of the extruding step for cleaning the extruding unit can be substantially eliminated to effect the practically continuous extruding process. The feed openings are always positioned upright to facilitate the resin introduction and the cleaning operation and simplify the attachment and detachment of the auxiliary equipment.

I claim:

1. A plastic resin kneading/extruding method, the method comprising the steps of:

supplying a resin to a first extruding unit of a plurality of extruding units through a resin feed hopper, said first extruding unit being located at an extruding position, each of said extruding units including a cylinder with a feed opening and a screw;

extruding and kneading the supplied resin through the first extruding unit at said extruding position by rotating the screw of the first extruding unit;

rotating said first extruding unit after said extrusion step to a cleaning position while rotating a second extruding unit of said plurality of extruding units to said extruding position;

supplying a resin to said second extruding unit at said extruding position; and extruding and kneading the supplied resin through the second extruding unit at said extruding position by rotating the screw of the second extruding unit, and cleaning the first extruding unit at the cleaning position.

2. A plastic resin kneading/extruding apparatus, the apparatus comprising:

a plurality of extruding units rotatably mounted around a revolver shaft, each of the extruding units comprising a feed opening;

rotating means for rotating said revolver shaft and thereby rotating said plurality of extruding units so as to position a feed opening of one of said plurality of extruding units adjacent to a resin feed hopper for feeding a resin to said one of said plurality of extruding units, and position a second one of said plurality of extruding units at a cleaning position where said second one of said plurality of extruding units is cleaned, wherein when said one of said plurality of extruding units is extruding a resin, said second one of said plurality of extruding units is being cleaned.

3. An apparatus according to claim 2, wherein said plurality of extruding units are mounted to said revolver shaft through support arms.

4. An apparatus according to claim 2, further comprising maintaining means for maintaining the feed openings of each of said plurality of extruding units upright during the rotation of said plurality of extruding units.

5. An apparatus according to claim 4, wherein said maintaining means comprises endless bands which are wrapped around said revolver shaft and said extruding units.

6. An apparatus according to claim 4, wherein said maintaining means comprises gear means positioned on each of said revolver shaft and said extruding units, and intermediate gears which cooperate with the gear means on said revolver shaft and the respective gear means on the extruding units.

* * * * *